United States Patent [19]

Martin

[11] Patent Number: 5,260,042
[45] Date of Patent: Nov. 9, 1993

[54] METHOD FOR INTRODUCING A TREATMENT MEDIUM INTO THE WASTE GAS FLOW IN COMBUSTION PROCESSES

[75] Inventor: Johannes J. E. Martin, Seeshaupt, Fed. Rep. of Germany

[73] Assignee: Martin GmbH fur Umwelt-und Energietechnik, Munich, Fed. Rep. of Germany

[21] Appl. No.: 601,215

[22] Filed: Oct. 19, 1990

[30] Foreign Application Priority Data

Oct. 24, 1989 [DE] Fed. Rep. of Germany ....... 3935402

[51] Int. Cl.$^5$ ............................................. C01B 21/20
[52] U.S. Cl. ................................. 423/235; 423/238; 422/172; 239/10
[58] Field of Search .................. 423/235, 405, DIG. 5, 423/238; 422/172, 82; 239/10

[56] References Cited

U.S. PATENT DOCUMENTS

| | | | |
|---|---|---|---|
| 3,565,575 | 2/1971 | Warshaw | 423/235 |
| 4,293,521 | 10/1981 | Isahaya | 422/62 |
| 4,302,205 | 11/1981 | Muraki | 23/232 R |
| 4,681,746 | 7/1987 | Michalak | 423/239 |

FOREIGN PATENT DOCUMENTS

| | | |
|---|---|---|
| 3721104 | 1/1988 | Fed. Rep. of Germany ... 423/DIG. 5 |
| 3705604 | 9/1988 | Fed. Rep. of Germany ...... 423/238 |
| 53-109866 | 9/1978 | Japan ................... 423/235 |

Primary Examiner—Gary P. Straub
Assistant Examiner—Timothy C. Vanoy
Attorney, Agent, or Firm—McAulay Fisher Nissen Goldberg & Kiel

[57] ABSTRACT

The method for introducing a treatment medium into the waste gas flow in combustion processes provides that a carrier medium be mixed with a treatment medium, wherein these media are brought to a pressure level necessary for the atomization in a one-component nozzle prior to mixing. The quantitative proportion of treatment medium to carrier medium, which is adjustable as desired, is adjusted as a function of the $NO_x$ gas concentration in the treated gas flow or as a function of the waste gas quantity. The atomization pressure is either predetermined as a fixed value corresponding to the nozzle configuration or adjusted as a function of the waste gas quantity. The atomization pressure can also possibly be regulated as a function of the evaporator load. Water serves as carrier medium, while ammonia, sal ammoniac, urea or calcium cyanamide is used as treatment medium.

8 Claims, 3 Drawing Sheets

METHOD FOR INTRODUCING A TREATMENT MEDIUM INTO THE WASTE GAS FLOW IN COMBUSTION PROCESSES

BACKGROUND OF THE INVENTION a) Field of the Invention

The invention is directed to a method for introducing a treatment medium in the form of chemicals into the waste gas flow in combustion processes by means of a carrier medium through an atomizing nozzle for reducing the nitric oxide concentration.

b) Background Prior Art

In order to reduce the nitric oxide emissions, it is known to introduce chemicals into the hot waste gas flow, generally ammonia, sal ammoniac, urea or calcium cyanamide, which can be mixed under certain circumstances with different hydrocarbon compounds as so-called reinforcing chemicals. The introduction is effected at temperatures of at least 600° C., wherein the most favorable possible uniform distribution of the chemicals is of decisive significance for an optimal running of the chemical reactions for bonding or reducing the nitric oxides. According to the current state of the art, the uniform distribution over the entire flue gas flow is achieved on the one hand by means of the arrangement of a plurality of nozzles along the cross section of the flue gas flue and on the other hand—and a particularly great importance is even attributed to this as a rule—by means of using two-component nozzles, steam or compressed air being supplied to the latter as atomizing medium. However, it is precisely the use of its own atomizing medium which has a number of disadvantages. Compressed air or steam are relatively expensive media, since they always require high amounts of energy and—in the case of steam—prepared evaporator feed water. The guidance of these media through lines until the individual nozzles proves to be costly, since either thermally insulated pipes must be used in the case of steam and/or relatively large pipe cross sections for reducing the pressure loss in the system. The expansion of the media at the nozzle outlet and the media flow in the lines generate a relatively high noise level which often even necessitates soundproofing. Further, it must also be taken into account that an unwanted dilution of the flue gases by air or steam reduces the efficiency of the steam production or possibly the waste gas cleaning system.

The use of two-component nozzles also brings about the disadvantage that the carrier medium which serves to atomize the treatment medium, i.e. the chemicals, must be used in large quantities, since the atomization is brought about due to kinetic energy of the carrier medium. Accordingly, a heavy dilution of the flue gases also occurs with small quantities to be atomized.

It is the object of the present invention to enable the introduction of a treatment medium, i.e. predetermined chemicals, such as ammonia, sal ammoniac, urea or calcium cyanamide into the flue gas with a high degree of efficiency, low expenditure of energy and low expenditure on construction.

This object is met, according to the invention, proceeding from a method of the type named in the beginning, in that the carrier medium is brought to a pressure level necessary for atomization and is supplied to an atomizing nozzle having a single nozzle opening, and in that the treatment medium, which is mixed with the carrier medium in any desired quantitative proportion immediately before exiting from the nozzle opening, is supplied to the atomizing nozzle, wherein the treatment medium is brought to the pressure level of the carrier medium prior to the mixing process.

By means of this method, it is possible to introduce any desired quantity of treatment media into the flue gas without operating the nozzle at different pressures and flow quantities, so that the nozzle constantly operates with the best efficiency. The quantity of treatment medium to be introduced is changed in that the ratio of carrier medium and treatment medium is variously adjusted prior to the atomization process. With the use of a one-component nozzle, operation can always be effected under the same conditions, in contrast to the two-component nozzles in which a reduction of the carrier medium was necessary when the quantity of treatment medium was reduced and in which an increase of the treatment medium necessarily required an increase of the carrier medium. Moreover, with the one-component nozzle, the atomization of the treatment medium is not effected on the basis of kinetic energy which must be applied by means of the carrier medium, but rather on the basis of the change in pressure prior to and subsequent to the nozzle opening, which leads to a substantial reduction of the carrier medium. This is necessary in order to operate the nozzle with a determined throughflow, regardless of the proportion and quantity of the treatment medium. Further, the carrier medium can serve to cool the atomizing nozzle when the atomization of the treatment medium is completely adjusted, this is when the treatment medium is set at the pressure of the carrier medium to provide complete atomization of the mixture out of the nozzle. In this case, as a result of the heating action in the furnace, the nozzle would be subject to impairments which are prevented by means of the atomization of the carrier medium.

According to a development of the invention, the quantity of added treatment medium can be adjusted as a function of the $NO_x$ gas concentration in the treated flue gas flow. The $NO_x$ gas concentration is thus measured in an area in which the treatment medium is already located and in which the corresponding chemical reaction has taken place.

However, the quantity of treatment medium can also be adjusted as a function of the waste gas quantity.

Further, the atomization pressure can be adjusted as a function of the waste gas quantity according to an advantageous embodiment of the invention.

In order to prevent excessive fluctuations in pressure in the overall system during the supply of treatment medium, it is advisable, in a further development of the invention, that the treatment medium be supplied to the atomizing nozzle in concentrated form, wherein the concentration is adjustable as a function of the required amount. In general, the concentration can be effected up to the respective solution limit of the treatment medium.

Ammonia, sal ammoniac, urea or calcium cyanamide, for example, can be used as treatment medium. In this treatment medium, it is advisable to use water as carrier medium.

The invention is explained in more detail in the following by means of the drawings.

DESCRIPTION OF THE PREFERRED EMBODIMENTS

Figure 1:
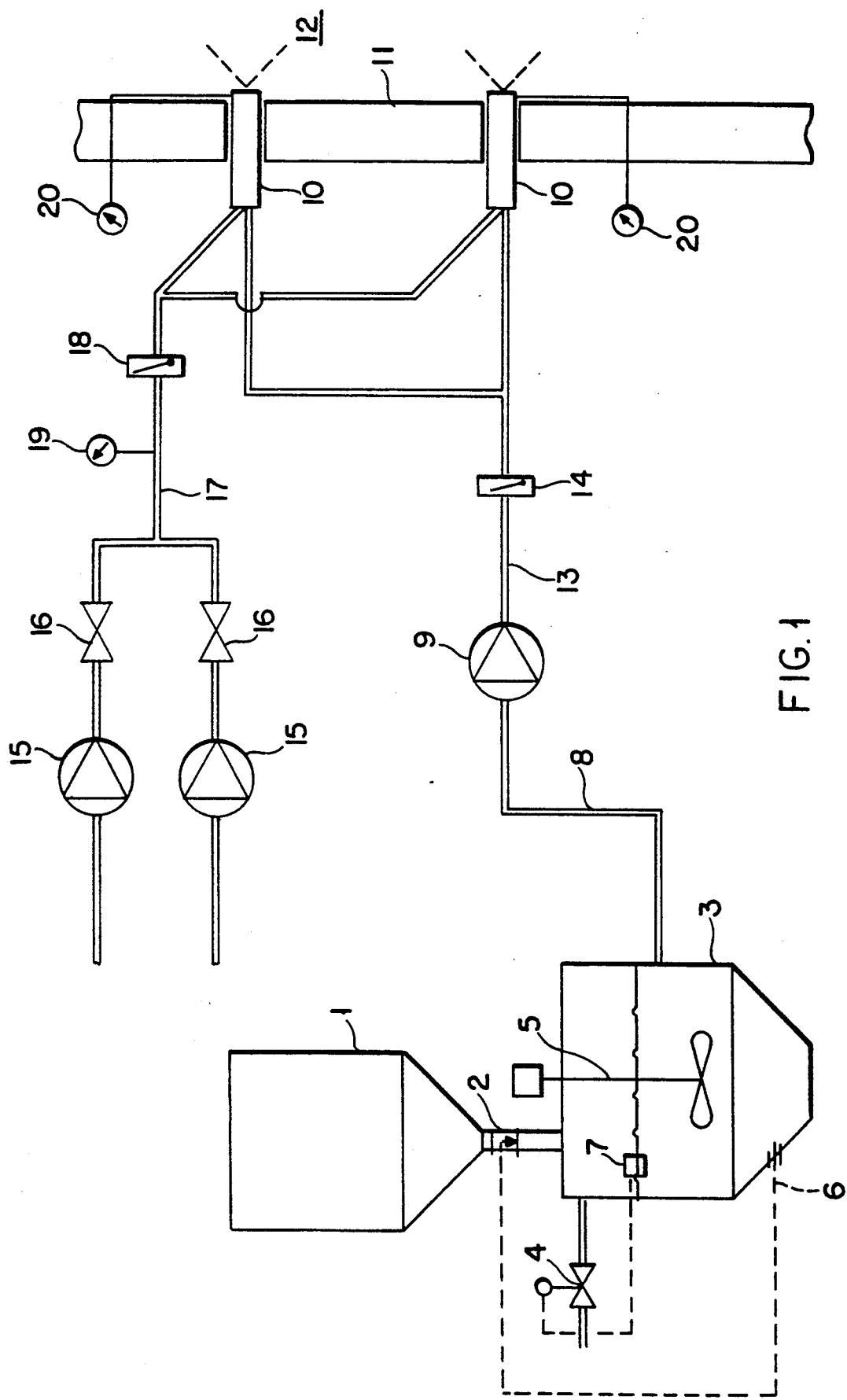
FIG. 1 shows a schematic flow chart for the carrier medium and the treatment medium.

The schematic flow chart for the carrier medium and the treatment medium can be seen in FIG. 1. According to the latter, a reservoir container for the chemical to be introduced into the furnace is designated by 1, the chemical being located in this container in the powdered state in the present example. The chemical arrives in a container 3 via a lock 2, water for dissolving the chemical being introduced into the container 3 via a valve 4. The prepared solution or suspension is kept in constant circulating motion by means of an agitator 5 in order to prevent separation. A level monitoring system, which provides for the feed of chemicals from the reservoir container 1 when falling below the minimum level, is designated by 6. A floater 7 monitors the liquid status in the container 3 and influences the valve 4 for feeding water into the container 3. The treatment medium is supplied to a plurality of atomizing nozzles 10 via a line 8 by means of a pump 9, which atomizing nozzles 10 are arranged in the wall 11 of a furnace 12 so as to be distributed in a plurality of planes. A check valve 14 is provided in the pressure line 13 leading from the pump 9 to the atomizing nozzles 10 in order to prevent the return flow of treatment medium into the container 3. The carrier medium, which is water in the present example, is guided by means of pumps 15, via valves 16, to a pressure line 17 which leads to the atomizing nozzles 10. A check valve 18 and a pressure measuring point 19 are provided inside the pressure line. Another pressure measuring point 20 monitors the pressure in the atomizing nozzles 10.

Figure 2:
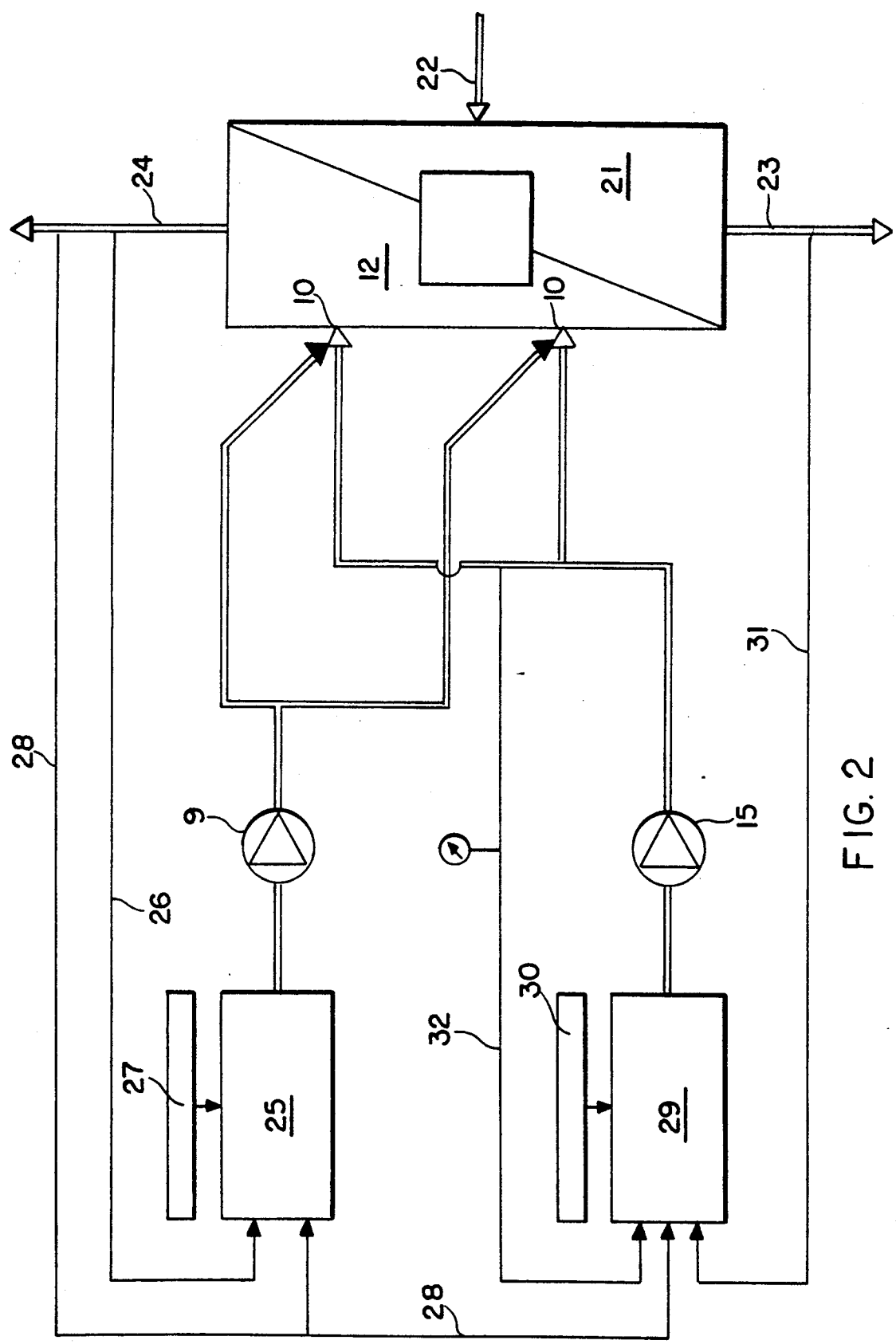
FIG. 2 shows a schematic view of the method flow chart according to FIG. 1 in connection with the regulating system.

The regulating system, which helps to regulate the introduction of the treatment medium, is now explained by means of FIG. 2. The same reference numbers are used insofar as parts which were already described in FIG. 1 are concerned. Treatment medium and carrier medium are supplied by means of pumps 9 and 15 to the atomizing nozzles 10 which open into the furnace 12. The boiler, to which feed water is supplied via a line 22, is designated in its entirety by 21. The steam tapping line is designated by 23, whereas the flue gas exhaust is symbolized by reference number 24.

The delivery quantity of treatment medium, i.e. the chemical which is provided for introduction into the furnace 12, is adjusted by means of a regulating system 25. The regulating is effected as a function of the $NO_x$ concentration in the flue gas 24, wherein the measurement of this gas concentration is effected at a location in which flue gas which has already been treated, i.e. flue gas mixed with the treatment medium, is located. This signal is fed to the regulating system 25 via the line 26. The value which when exceeded causes treatment medium to be fed into the furnace for treating the flue gas is adjusted by means of a reference value transmitter 27 for the reference value of the $NO_x$ content in the flue gas. The feed of treatment medium is thus regulated as a function of the difference between the actual $NO_x$ content fed via the line 26 and the value predetermined by the reference value transmitter 27. Further, the regulating system 25 can also regulate the supplied quantity of treatment medium as a function of the flue gas volume flow, wherein this value is measured in the flue gas exhaust 24 and supplied to the regulating system 25 by means of the line 28.

This measurement value, which concerns the volume flow of the flue gas, is also directed via a line 28 to an additional regulating system 29 which is provided for adjusting the atomizing pressure. A reference value transmitter 30 for the atomizing pressure predetermines a fixed value conforming to the nozzle configuration or the atomizing pressure can be adjusted as a function of the flue gas volume flow or the evaporator load. The measurement value concerning the flue gas volume flow is fed via the line 28, while the measurement value concerning the evaporator load is fed via the line 31. A signal line which supplies the actual prevailing atomization pressure to the regulating system 29 is designated by 32.

Figure 3:
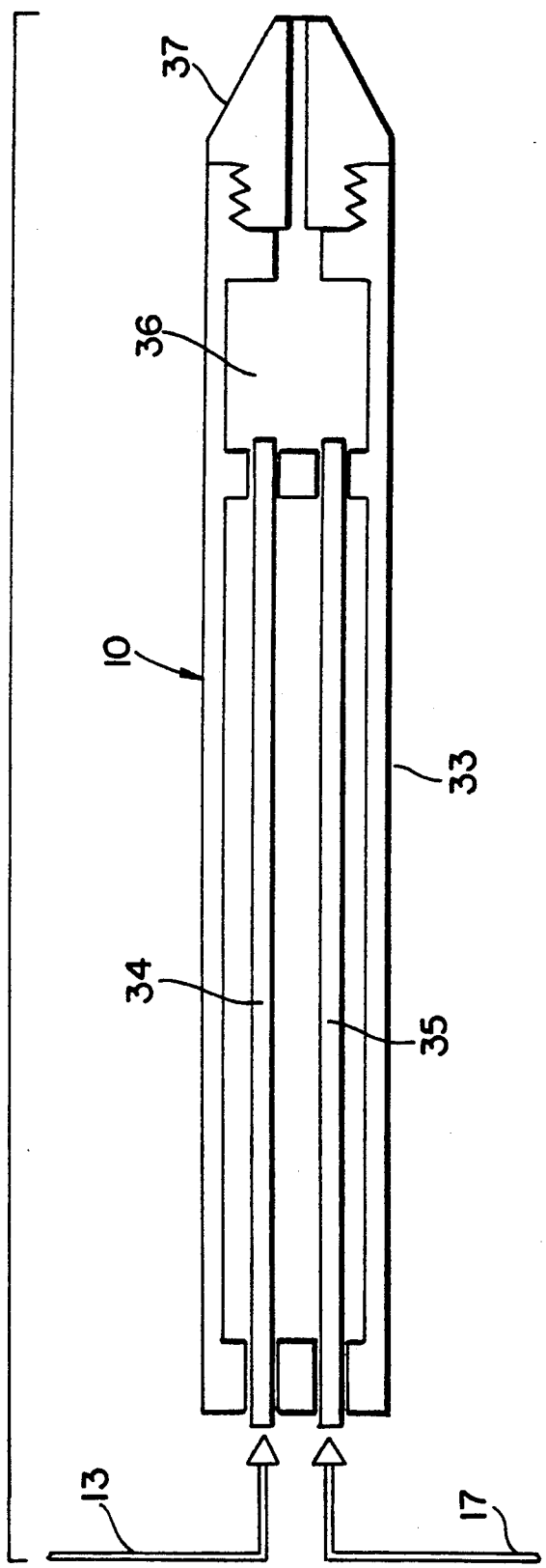
FIG. 3 shows a section through an atomizing nozzle for application in the method according to the invention.

FIG. 3 shows a schematic section through an atomizing nozzle 10. The latter comprises a nozzle body 33 which comprises feed lines 34 and 35 on the one hand and a mixing chamber 36 on the other hand. The feed lines 34 and 35 open into the mixing chamber 36 and are connected at their other ends with the feed line 13 for the treatment medium and with the feed line 17 for the carrier medium. A nozzle head 37, which can be screwed on the nozzle body 33 and comprises an atomizing bore hole 38 from which the mixture of carrier medium and treatment medium exits under pressure and is finely atomized on the basis of the prevailing pressure difference inside and outside the atomizing nozzle, is directly connected to the mixing chamber 36 in which the carrier medium and the treatment medium are mixed together. While the foregoing description and drawings represent the preferred embodiments of the present invention, it will be obvious to those skilled in the art that various changes and modification made therein without departing from the true spirit and scope of the present invention.

I claim:

1. In a method for introducing a treatment medium in the form of chemicals into the waste gas flow in combustion processes by means of a carrier medium through an atomizing nozzle for reducing the nitric oxide concentration, the improvement comprising the steps of bringing the carrier medium to a pressure level necessary for atomization by a single opening atomizing nozzle due to the pressure differential before and after the nozzle opening, bringing the treatment medium to the pressure level of the carrier medium, then mixing the treatment medium with the carrier medium immediately prior to emergence from the nozzle opening in any desired quantitative proportion and feeding the mixture to the atomizing nozzle.

2. The method according to claim 1, including the step of adjusting the quantity of treatment medium as a function of the $NO_x$ concentration in the treated flue gas flow following treatment by the treatment medium.

3. The method according to claim 1, including the step of adjusting the quantity of treatment medium as a function of the waste gas quantity.

4. The method according to claim 1 including the step of adjusting the atomizing pressure as a function of the waste gas quantity.

5. The method according to claim 1, including the steps of adjusting the atomization pressure as a function of the evaporator load.

6. The method according to claim 1, including the step of feeding the treatment medium to the atomizing nozzle in concentrated form, wherein the concentration is adjustable as a function of the required quantity.

7. The method according to claim 1, wherein ammonia, sal ammoniac, urea or calcium cyanamide is used as treatment medium.

8. The method according to claim 1, wherein water is used as carrier medium.

* * * * *